(No Model.)

M. A. IHRIG.
SCREW ADAPTED FOR ICE CREEPERS.

No. 315,293. Patented Apr. 7, 1885.

Witnesses:
O. M. Nichols.
R. F. Brandom.

Inventor.
Mary A. Ihrig
By S. Emory Whitney
Atty.

UNITED STATES PATENT OFFICE.

MARY A. IHRIG, OF SPRINGFIELD, OHIO.

SCREW ADAPTED FOR ICE-CREEPERS.

SPECIFICATION forming part of Letters Patent No. 315,293, dated April 7, 1885.

Application filed July 9, 1884. (No model.)

*To all whom it may concern:*

Be it known that I, MARY A. IHRIG, of the city of Springfield, county of Clark, and State of Ohio, have invented certain new and useful Improvements in Screws, of which the following is a specification.

This invention relates to screws, the object of the invention being to provide a screw having points or barbs upon its head, and to so construct the screw that its barbs or points may be easily sharpened, should they become dull or blunt.

With this object in view my invention consists in a screw, the head of which is square and has two transverse V-shaped grooves formed in the face thereof, the length and greatest breadth of which is equal to the width of the screw-head, to thereby form pyramidal points at the corners of the screw-head, substantially as hereinafter described.

Figure 1:
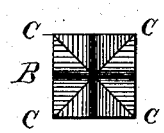
Figure 2:
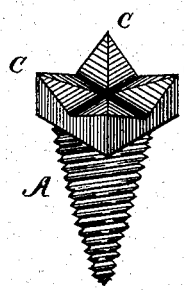

Figure 1 represents in plan view a screw made in accordance with my invention, and Fig. 2 a perspective view of the same.

The screw of any suitable metal is provided with a screw-threaded shank, A, tapered, preferably, as shown in the drawings, and a square head, B, of slightly greater diameter than the diameter of the shank A. This head B has two transverse V-shaped grooves cut in its face, said grooves being preferably of a width equal, or nearly so, to the width of the screw-head and extending the entire length of the screw-head in a line central thereto in opposite directions, thus forming four pyramidal points, C, one at each corner of the screw-head. These V-shaped grooves may be cut into the screw-head by any suitable tool, and will in practice be cut prior to cutting the screw-threads upon the shank of the screw. This may be done upon a screw-machine of ordinary construction with slight changes being made therein. By forming the points C by cutting V-shaped grooves in the face of the screw-head it will be noticed that should the points become dulled they may be sharpened with a V-shaped or three-pointed file of ordinary construction. This construction of a barbed screw for facilitating sharpening of the barbs or points is of great consideration.

In practice, where the screw is used with shoes as ice-creepers, the shank will be screwed into the sole of the shoe or heel, and the head, being of greater diameter than the shank, will bear against the sole and prevent its being accidentally driven through the sole, as shown and described in a Patent No. 301,818, granted to me July 8, 1884, for ice-shoes or creepers.

This my improved screw is applicable to many things and for many purposes, therefore I do not desire to limit myself to any special use.

I am aware that a Patent No. 180,578 was granted for a screw having a series of radial arms projecting from the head of the screw; but I am not aware that a patent has been granted for a screw having four pyramidal points projecting vertically or in a line with the length of the screw as shown in my drawings and described in the specification. The construction described in Patent No. 180,578 I do not claim; nor do I claim a shoe provided with spikes having points as claimed in Patent No. 301,818.

It will be noticed that in sharpening the points of the screw the file which is V-shaped will have a bearing upon all four of the points at the same time, thereby sharpening one side of each of the four points simultaneously.

I claim—

As a new article of manufacture, a screw the head of which is square and has two transverse V-shaped grooves formed in the face thereof, the length and greatest breadth of the grooves being equal, or nearly so, to the width of the screw-head, to thereby form four pyramidal points, one at each corner of the screw-head, substantially as and for the purpose described.

In witness whereof I have hereunto set my hand and seal, at Springfield, Ohio, this 5th day of July, A. D. 1884.

MARY A. IHRIG. [L. S.]

In presence of—
P. J. CLEVENGER,
N. E. C. WHITNEY.